Dec. 22, 1959  A. ARLAUSKAS  2,918,275
OPERATING APPARATUS FOR A PIVOTED WINDOW
Filed June 27, 1958  3 Sheets-Sheet 2

INVENTOR.
Alphonsas Arlauskas
BY
W. S. Pettigrew
ATTORNEY

Dec. 22, 1959   A. ARLAUSKAS   2,918,275
OPERATING APPARATUS FOR A PIVOTED WINDOW
Filed June 27, 1958   3 Sheets-Sheet 3
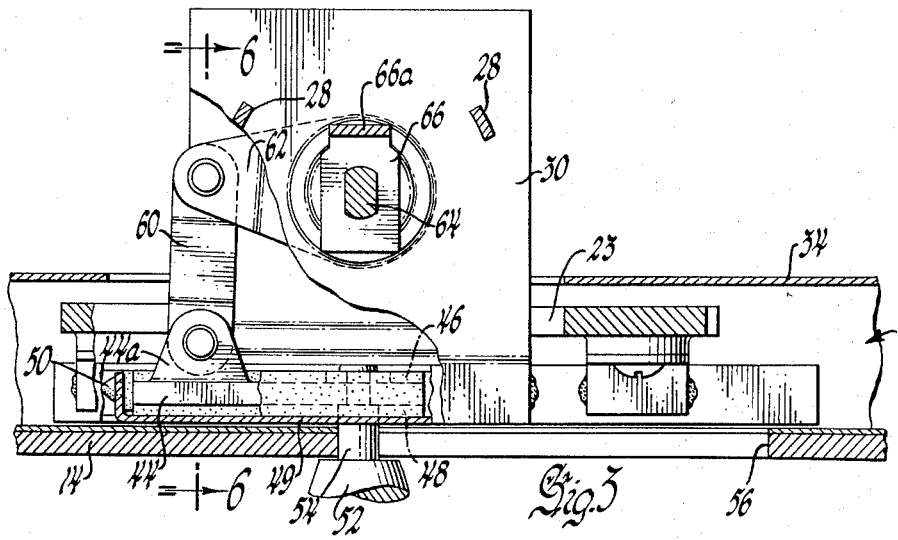
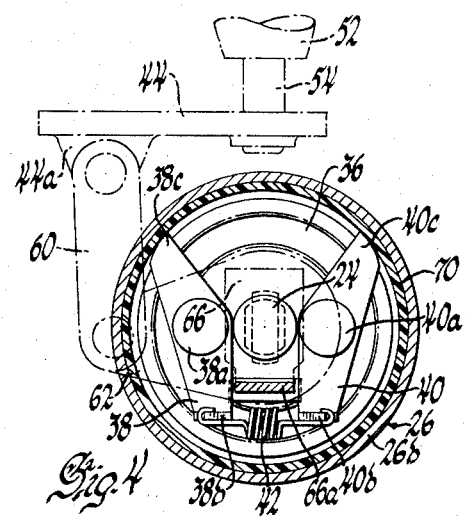
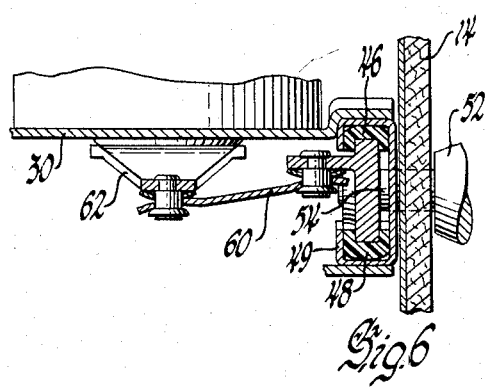
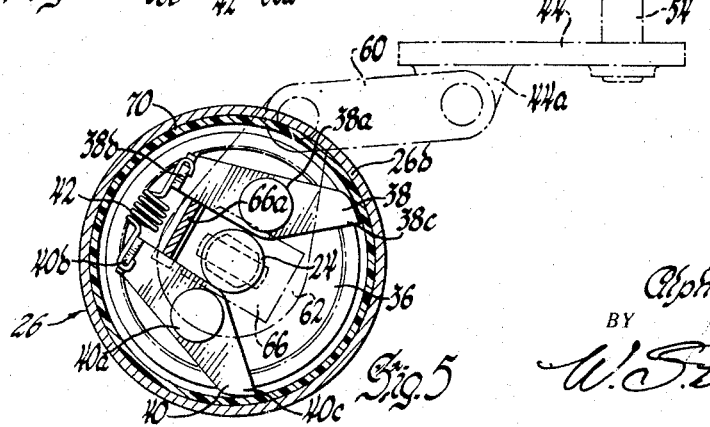
INVENTOR.
Alphonsas Arlauskas
BY
W. S. Pettigrew
ATTORNEY

United States Patent Office 2,918,275
Patented Dec. 22, 1959

2,918,275

OPERATING APPARATUS FOR A PIVOTED WINDOW

Alphonsas Arlauskas, Detroit, Mich., assignor to General Motors Corporation, Detroit, Mich., a corporation of Delaware Application June 27, 1958, Serial No. 745,171

5 Claims. (Cl. 268—121)

This invention relates to operating apparatus for a pivoted window, and more particularly to operating apparatus for a pivoted ventilating window in an automobile which prevents forcing the window from outside the automobile.

One feature of the invention is that it provides improved operating apparatus for a pivoted window; another feature of the invention is that it provides operating apparatus which couples force exerted through the inside operating means to the window shaft but which acts as a brake to prevent rotation of the window and shaft upon the application of a pivoting force transmitted through said window, whereby the window cannot be forced open or closed from outside the car; still another feature of the invention is that it provides movable clutch means connected to the window shaft and engageable with a coupling member for pivoting said shaft and window upon movement of the window operating means, said clutch means acting as a brake to prevent rotation of the shaft and window upon the application of a pivoting force transmitted through said window; and still a further feature of the invention is that it is particularly adaptable for use in a pivoting window operated by means of a rectilinearly slidable member.

Other features and advantages of the invention will be apparent from the following description and from the drawings, in which:

Fig. 3 is a fragmentary horizontal section taken along the line 3—3 of Fig. 2;

Fig. 4 is a fragmentary horizontal section taken along the line 4—4 of Fig. 2;

Fig. 5 is a view similar to Fig. 4 but showing the parts in a different position; and Fig. 6 is a section taken along the line 6—6 of Fig. 3.

Figure 1:
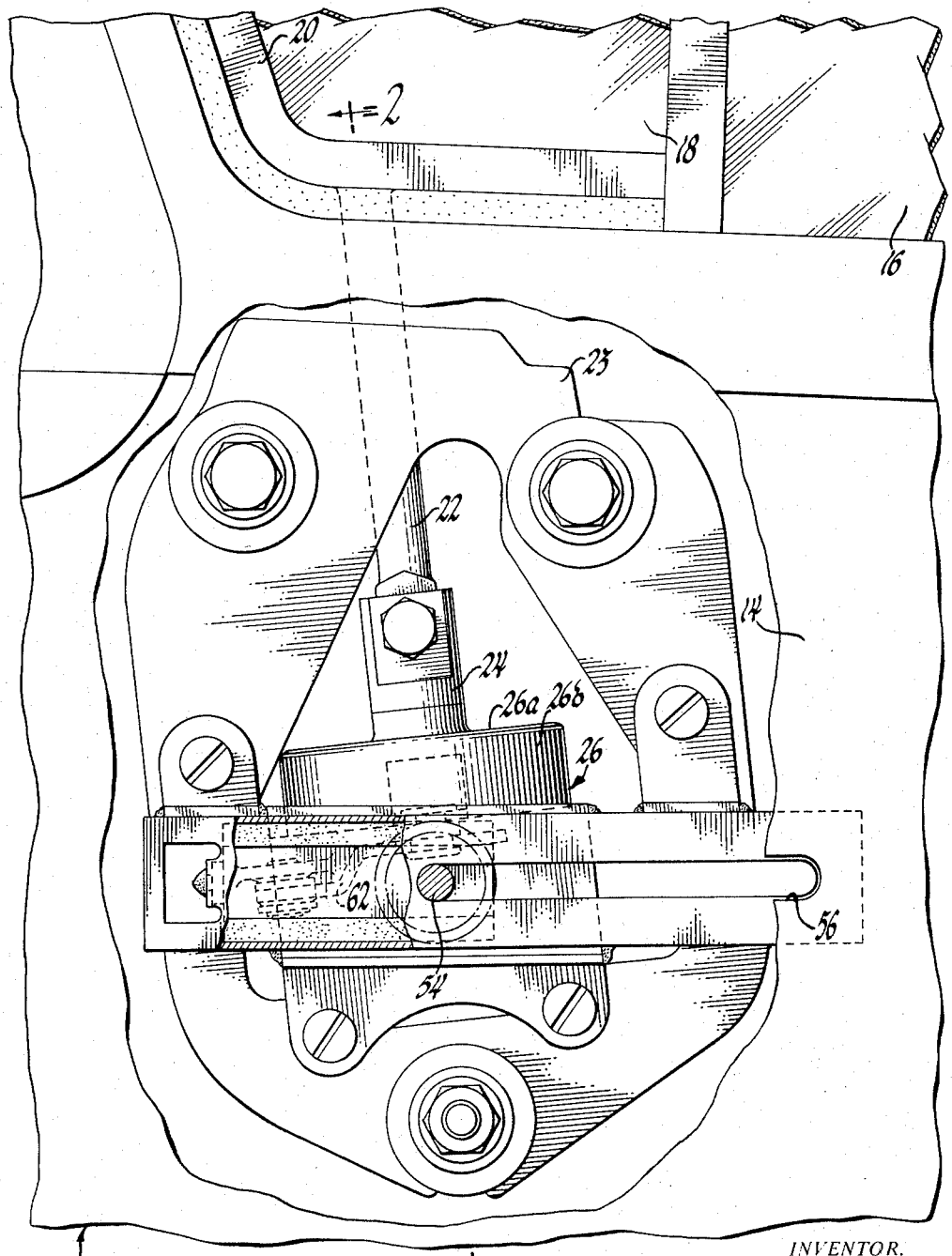
Fig. 1 is a fragmentary inside elevational view of an automobile door having a pivoted window and including the novel operating means, portions of the door inner panel being broken away to show underlying structure.
Figure 2:
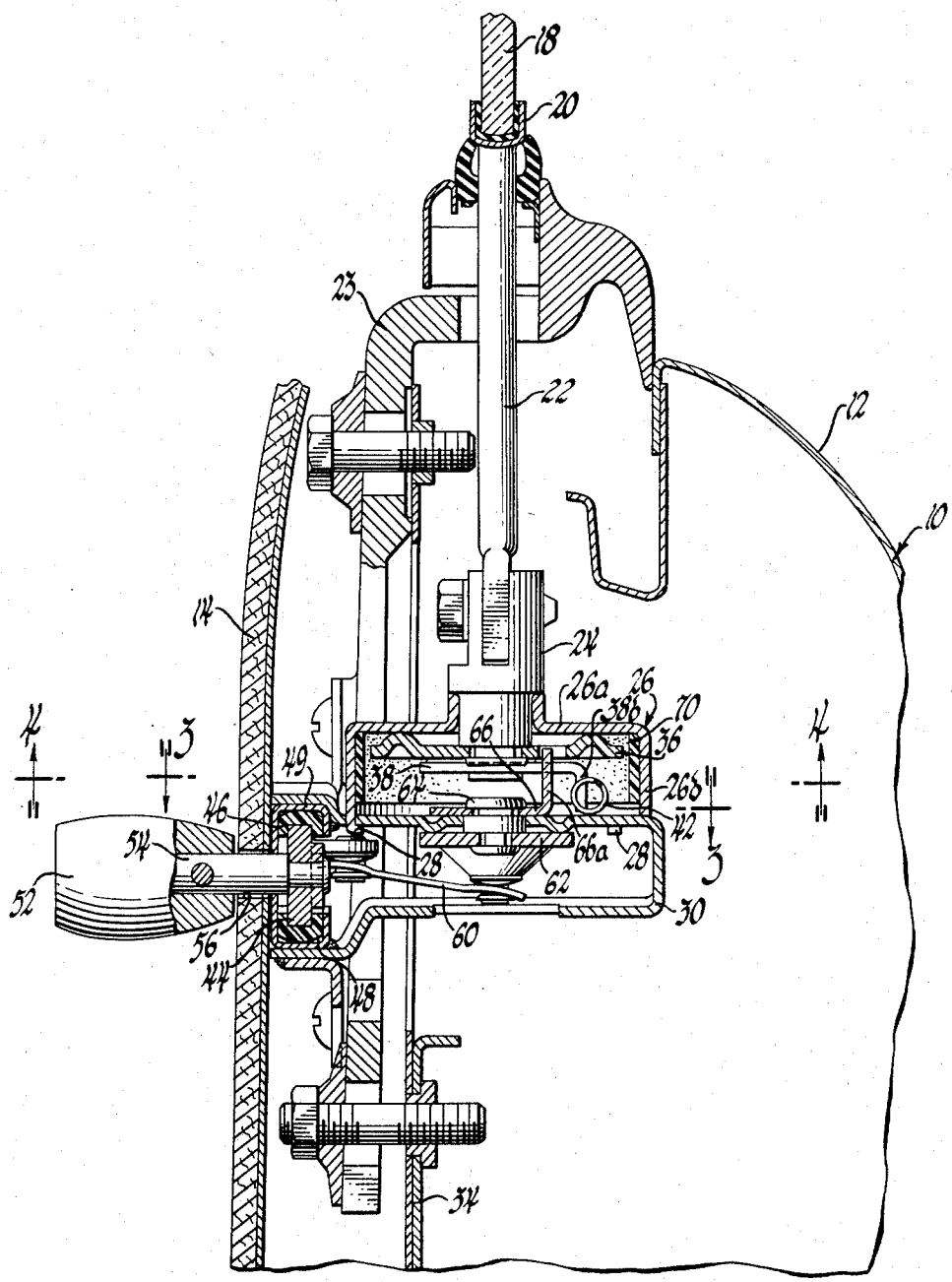
Fig. 2 is a vertical section taken along the line 2—2 of Fig. 1.

Most automobiles are provided with a pivoting ventilating window in each front door and there may also be a similar window in each rear door or in each rear quarter panel, each of these windows being provided with an inside operating means. This invention provides novel apparatus to prevent the window from being forced open or closed from the outside, i.e., by force transmitted through the window rather than through the inside operating means. Briefly, the inside operating means is connected through a coupling device to a movable clutch means which is connected to the window shaft. When force is transmitted to the clutch means through the operating means and coupling device, the clutch means transmits the force to the shaft to swing the window open or closed. However, if force is transmitted through the window itself, the clutch device acts as a brake to block swinging movement of the window.

Referring now more particularly to the drawings, an automobile door is designated generally as 10. The door has an outer panel 12 and an inner panel 14, both of which terminate adjacent the belt line of the automobile to provide space for a window opening, the bulk of which opening is closed by a sliding window 16 and one side of which opening is closed by a pivoted window 18 carried in a frame 20.

The window 18 pivots about the longitudinal axis of a pivotally mounted shaft 22 which is secured to the window frame and which extends down through a support bracket 23 carried in the door into the space between the door outer and inner panels 12, 14 where it is bolted to a stub shaft 24 that is rotatably journaled in a stationary housing 26. As shown in the drawings, the housing 26 is in the form of an inverted cup having a top base side 26a and a cylindrical side wall 26b. The housing 26 is stationarily mounted by means of a plurality of tabs 28 projecting therefrom and extending through slots in a support bracket 30 which is bolted to the support bracket 23 mounted on a support panel 34 inside the door.

Inside the housing 26 on the bottom end of the stub shaft 24 a plate 36 is staked for rotation with the shaft, and a pair of clutch shoes 38 and 40 are rotatably mounted on the underside of the plate 36 by rivets 38a and 40a. As shown best in Figs. 4 and 5, the clutch shoes are identical with each other except for being of different hand. Each shoe is elongated and is mounted intermediate its ends. At one end each shoe has a turned tab 38b, 40b, and a tension spring 42 is connected between the tabs 38b, 40b to bias this end of the shoes toward each other, thus urging the opposite ends of the shoes away from each other. Each shoe is formed with a friction brake portion 38c, 40c at its opposite end.

Operating means for swinging the window from inside the vehicle body comprises a rectilinearly movable slide 44 with nylon guide shoes 46, 48 slidably mounted in a trackway 49 carried on the bracket 30 which extends parallel to the door inner panel 14. The trackway 49 is provided at its end with a rubber bumper 50 to cushion terminal movement of the slide and the slide is movable in a horizontal path by means of a gripping knob 52 which has a shaft 54 riveted to the slide and projecting through a slot 56 in the door inner panel 14. At its forward end the slide 44 is formed with a boss 44a to which one end of a link 60 is pivotally connected, the other end of the link being pivotally connected to a crank 62 which in turn is pivoted on a rivet 64 journaled in a wall of the bracket 30. On the other side of the wall of the bracket 30, the rivet 64 rigidly mounts an L-shaped coupling member 66 having an upwardly extending arm 66a which, as shown best in Figs. 4 and 5, extends between the clutch shoes 38, 40 adjacent the spring-biased end thereof.

Fig. 4 illustrates the relationship of the parts in window-closed position, and Fig. 5 illustrates the parts in window-open position. In order to open the window, the gripping knob 52 is moved from the position of Fig. 4 to the position of Fig. 5, moving the slide 44 rearwardly and, through the link 60, swinging the crank 62 in a clockwise direction. Since the crank 62 and the coupling member 66 are both rigidly mounted on the rivet 64, the coupling member 66 is also rotated through an arc about the axis of the rivet 64. During movement of the parts from the position of Fig. 4 to the position of Fig. 5, the upstanding arm 66a of the coupling member picks up the clutch shoe 38, holding its brake surface 38c out of braking engagement with a brake liner 70 which is mounted on the cylindrical wall 26b of the cup-shaped housing 26, so that the operating apparatus is coupled to the shaft 22 through the coupling member 66, the shoe 38, and the plate 36. The brake surface portion of the shoe 40 is so arranged that during rotation in the direction above described, it merely slides over the brake lining. If the parts are now moved by the handle 52 back from the position of Fig. 5 to the position of Fig. 4, the coupling to drive the window will be obtained through the clutch shoe 40, and the clutch shoe 38 will not prevent movement of the window because brake surface 38c is arranged merely to slide over the brake liner; however, if force is exerted through the window itself in an attempt to open or close the window, there is no camming action on the clutch shoes 38 and 40 by the coupler 66a and the brake portion of one of these shoes will grip the brake lining 70, there being sufficient friction between the shoe and the lining to jam the parts and prevent rotation of the shaft 22 or the window 18. For example, upon the application of a pivoting force to open the window transmitted through the window 18 in a clockwise direction in Fig. 4, the brake portion 38c of the clutch shoe 38 will grip the liner 70 and jam the mechanism. Conversely, upon the application of a pivotal force to close the window transmitted through the window in a counterclockwise direction in Fig. 5, the brake portion 40c of the clutch shoe 40 will grip the brake liner 70 and jam the mechanism.

By virtue of the spaced clutch shoes and the coupling member 66 as above described, an operating device for a pivoted window is provided which is simple, cheap to construct, and which requires little space in the door, and which is effective to permit the window to be operated through the regular operating means but which is effective to prevent opening or closing the window upon the application of force transmitted through the window. While the structure is shown in connection with a slidable operating device, it will be understood that it is equally applicable for use with other known forms of window operators, as for example, cranks and the like.

While I have shown and described one embodiment of my invention, it is capable of many modifications. Changes, therefore, in the construction and arrangement may be made without departing from the spirit and scope of the invention as set forth in the appended claims.

I claim:

1. Operating apparatus for a pivoted window, including: a shaft connected to the window; means mounting the shaft for pivotal movement about its longitudinal axis to pivot said window between open and closed positions; movable operating means for pivoting said shaft; a movable coupling member; means connecting the coupling member to the operating means for movement thereby; movable clutch means connected to said shaft and engageable with said coupling member for pivoting said shaft and window upon movement of said operating means, comprising a plate mounted on said shaft for rotation therewith, two spaced clutch shoes, each pivotally mounted intermediate its ends on said plate, and spring means biasing said shoes toward each other at one end, each shoe having a brake portion at its other end and said coupling member projecting between the shoes adjacent said one end; and brake means engageable by one of said shoes to prevent rotation of said shaft upon the application of a pivoting force transmitted through said window.

2. Apparatus of the character claimed in claim 1, wherein said brake means comprises a brake liner mounted adjacent the brake portion of said shoes for engagement thereby upon the application of a pivoting force transmitted through said window.

3. Operating apparatus for a pivoted window, including: a shaft connected to the window; means mounting the shaft for pivotal movement about its longitudinal axis to pivot said window between open and closed positions, said means including a housing having a cylindrical wall; movable operating means for pivoting said shaft; a movable coupling member; means connecting the coupling member to the operating means for movement thereby; movable clutch means connected to said shaft and engageable with said coupling member for pivoting said shaft and window upon movement of said operating means, comprising two spaced clutch shoes, each pivotally mounted intermediate its ends in said housing, and spring means biasing said shoes toward each other at one end, each shoe having a brake portion at its other end and said coupling member projecting between the shoes adjacent said one end; and brake means comprising a brake liner on the cylindrical wall of said housing, said liner being engageable by the brake portion of either of said shoes to prevent rotation of said shaft upon the application of a pivoting force transmitted through said window.

4. Operating apparatus for a pivoted window, including: a shaft connected to the window; means mounting the shaft for pivotal movement about its longitudinal axis to pivot said window between open and closed positions; movable operating means for pivoting said shaft, comprising a rectilinearly movable slide, a gripping knob connected to said slide, a rotatably mounted crank, and a link connecting the slide to the crank; a movable coupling member mounted on said crank; movable clutch means connected to said shaft and engageable with said coupling member for pivoting said shaft and window upon movement of said operating means, comprising a plate mounted on said shaft for rotation therewith, two spaced clutch shoes, each pivotally mounted intermediate its ends on said plate, and spring means biasing said shoes toward each other at one end, each shoe having a brake portion at its other end and said coupling member projecting between the shoes adjacent said one end; and brake means comprising a brake liner engageable by the brake portion of either of said shoes to prevent rotation of said shaft upon the application of a pivoting force transmitted through said window.

5. Operating apparatus for a pivoted window, including: a shaft connected to the window; means mounting the shaft for pivotal movement about its longitudinal axis to pivot said window between open and closed positions, including a housing having a cylindrical wall; movable operating means for pivoting said shaft, comprising a rectilinearly movable slide, a gripping knob connected to said slide, a rotatably mounted crank, and a link connecting the slide to the crank; a movable coupling member mounted on said crank and projecting in said housing; movable clutch means connected to said shaft and engageable with said coupling member for pivoting said shaft and window upon movement of said operating means, comprising a plate mounted on said shaft in the housing for rotation with the shaft, two spaced clutch shoes, each pivotally mounted intermediate its ends on said plate, and spring means biasing said shoes toward each other at one end, each shoe having a brake portion at its other end and said coupling member projecting between the shoes adjacent said one end; and brake means comprising a brake liner on the cylindrical wall of said housing engageable by the brake portion of either of said shoes to prevent rotation of said shaft upon the application of a pivoting force transmitted through said window.

References Cited in the file of this patent

UNITED STATES PATENTS

| | | |
|---|---|---|
| 2,569,565 | Hiser | Oct. 2, 1951 |
| 2,624,570 | Dennis | Jan. 6, 1953 |